(12) United States Patent
Hastings (10) Patent No.: US 6,792,753 B2
(45) Date of Patent: Sep. 21, 2004

(54) SYSTEM FOR GENERATING POWER (76) Inventor: Stephen John Hastings, 3 Brandon Court, Endeavour Hills, Victoria 3802 (AU)

( * ) Notice: Subject to any disclaimer, the term of this patent is extended or adjusted under 35 U.S.C. 154(b) by 53 days.

(21) Appl. No.: 10/291,031

(22) Filed: Nov. 8, 2002

(65) Prior Publication Data

US 2003/0192308 A1 Oct. 16, 2003

(30) Foreign Application Priority Data

Apr. 15, 2002 (AU) .................................... PS 1758/2002

(51) Int. Cl.[7] .............................................. F16D 31/02
(52) U.S. Cl. .......................................... 60/398; 290/53
(58) Field of Search ............................. 60/398; 290/42, 290/53

(56) References Cited

U.S. PATENT DOCUMENTS

| | | | | |
|---|---|---|---|---|
| 4,263,516 A | * | 4/1981 | Papadakis | 60/398 |
| 4,421,990 A | * | 12/1983 | Heuss et al. | 290/53 |
| 5,222,833 A | | 6/1993 | Gorlov | |
| 6,114,773 A | * | 9/2000 | Kouris | 60/398 |

FOREIGN PATENT DOCUMENTS

| | | |
|---|---|---|
| CH | 653 102 | 12/1985 |
| CN | 1092846 | 9/1994 |
| EP | 573 242 | 8/1993 |
| GB | 2182980 | 5/1987 |
| GB | 2 327 241 | 1/1999 |
| JP | 11-351119 | 12/1991 |
| JP | 2000-18146 | 1/2000 |
| SU | 1199969 | 12/1985 |
| SU | 1490223 | 6/1989 |

* cited by examiner

Primary Examiner—Edward K. Look
Assistant Examiner—Michael Leslie
(74) Attorney, Agent, or Firm—Welsh & Katz, Ltd.

(57) ABSTRACT

A system for generating power, including:
  a barrier partially dividing a body of water subject to tidal effects into two regions of water such that said regions of water have differing water levels over a tidal cycle;
  a passage in said barrier for placing said regions of water in fluid communication with each other; and
  means within said passage responsive to flow of water for driving a power generation means;
  wherein water flows from one of said regions of water to the other of said regions of water via said passage when said regions have differing water levels during said tidal cycle.

7 Claims, 6 Drawing Sheets

SYSTEM FOR GENERATING POWER

FIELD OF THE INVENTION

The present invention relates to a system for generating power. In particular, the invention relates to a system for generating power from two bodies of water.

BACKGROUND TO THE INVENTION

There have been proposals to extract power from the movement of water using differential pressure and/or the influence of tidal effects. Examples of such proposals include hydroelectric dams, weirs and reservoirs.

One proposed system involves providing two walls to respectively dam a pair of inlets divided by an intervening promontory. Each wall extends from one side of its respective inlet to the promontory. A gate or lock is provided in one of the walls to regulate the level of water in that particular bounded inlet. Thus, in effect, two bounded reservoirs are formed, of which the water level of one can be adjusted by its gate or lock. A passage extending through the promontory allows fluid communication between the two reservoirs and a turbine is located within the passage. When there is a difference in water pressure between the two reservoirs electricity is generated by allowing water to flow through the passage and drive the turbine. The lock or gate is used to regulate the level of its bounded inlet to ensure it has a higher water level compared to the other bounded so as to create the difference in water pressure between the two reservoirs.

One disadvantage of the above system is that it requires the building of two separate walls, one with a lock or gate, to seal off the inlets. This results in significant expense and inconvenience in construction of the sealing walls and the gate or lock for the system. Another disadvantage is that the above system can only generate power by a one way movement of water from the designated high level water reservoir or inlet to the low level reservoir or inlet. Therefore, the system is dependent on recharging the high level reservoir, which can only be done when sea level is higher than the water level of the high level reservoir. In turn, the level of the designated high level reservoir must be higher than the designated low level reservoir, otherwise water would not flow from the high level reservoir to the low level reservoir.

SUMMARY OF THE INVENTION

The present Applicant believes that a possible solution or at the very least an economic alternative can be based on using natural tidal effects to generate power from localised areas of water with different water pressures.

The present invention provides a system for generating power, including:
- a barrier partially dividing a body of water subject to tidal effects into two regions of water such that said regions of water have differing water levels over a tidal cycle;
- a passage in said barrier for placing said regions of water in fluid communication with each other; and
- means within said passage responsive to flow of water for driving a power generation means;
- wherein water flows from one of said regions of water to the other of said regions of water via said passage when said regions have differing water levels during said tidal cycle.

The present invention is particularly applicable where there is a relatively large body of water, such as a bay, partially separated from a sea or ocean by naturally occurring land masses, such as those at the inlet of the bay. In this situation, water levels inside and outside the bay will take some time to equalise as the tide goes in or out. The invention takes advantage of the resulting difference in water levels inside and outside the mouth of the bay. Because tidal effects will cause one region of water to have a higher water pressure than the other region at certain times in a normal daily cycle (until this is naturally equalised through the unbounded body), there is no need to artificially create differences in water pressure between the two regions, as in the previously proposed system. The barrier need only be of sufficient size to induce differential water pressures in the two regions. The barrier may be completely natural in form or may include a man-made extension to an existing land mass. The barrier must be of a length sufficient to induce a time lag in water level equalisation as the tide rises or falls on one side thereof. A length in excess of 1 kilometer is preferable.

It is preferred that the barrier is a land mass, such as a peninsula, promontory, an isthmus or the like, which in combination with other naturally occurring land masses defines the two partially divided regions of water. Preferably, the power generation means may be driven by water flow in either direction. The regions of water may be localised zones in proximity to the ends of the passage.

The ends of the passage may have ports to facilitate the flow of water into the passage. The ports preferably have enlarged openings to facilitate the flow of water into the passage. The openings may be flared outwards, or may have a frusto-conical shape. In one embodiment the openings are curved funnels. Preferably, the ports each have filtering means, for example including a grating, for preventing objects entering the passage. The filtering means may also include a kink or s-bend in the passage to settle out waterborne solids from the water flowing through the passage. A sump may be provided at the kink or s-bend to remove the settled solids. The grating is preferably self-cleaning.

In one embodiment, the ports have one or more vertically extending conduits for further facilitating flow of water. The conduits preferably have mechanically closeable vents at one or more locations on the conduits for providing multiple entry points for water into and out of the passage. The vents may be automatically opened or closed in response to a sensed water level or on a tidal cycle.

Preferably, the means for driving the power generation means is a turbine driven by the water flow through the passage. The power generation means need not be located adjacent the turbine.

The present invention further provides a method for generating power, including the steps of:
- providing a passage in a barrier, the barrier partially dividing a body of water subject to tidal effects into two regions of water such that said regions of water have differing water levels over a tidal cycle, the passage placing said regions of water in fluid communication with each other; and
- driving a power generation means by driving means located within said passage in response to flow of water from said one of said regions of water to the other of said regions of water via said passage when said regions have differing water levels during said tidal cycle.

The passage preferably narrows near the means for driving the power generation means to increase the speed of flow of water at said means for driving the power generation means. Alternatively, the passage has a portion for increasing the speed of flow of water at said means for driving the power generation means. In this case it is preferred that the means for driving the power generation means is located near or at the end of the speed increasing portion. In a preferred embodiment, the speed increasing portion is substantially vertical.

A non-return valve is preferably provided in said passage downstream of said means for driving the power generation means to prevent the back flow of water in said passage.

In one preferred embodiment of the invention, the power generation means includes a first power generator;

said means for driving the power generation means includes a first means for driving the first power generator;

said passage includes a conduit in fluid communication with said regions of water and a first section in fluid communication with one region of said regions of water;

said first section being in fluid communication with said conduit via a first non-return valve and including said first means for driving the first power generator;

such that when said one region has a higher water pressure than the other region of said regions of water, water from said one region flows into said first section and said conduit, wherein water flowing through said first section drives said first means for driving the first power generator and enters into said conduit via said first non-return valve for discharge into said other region.

The above described arrangement provides for greater power generation efficiency over half of a tidal cycle.

Preferably, the first section has a portion to increase the speed of flow of water at said first means for driving the first power generator. It is preferred that the speed increasing portion of said first section is substantially vertical.

The system may include a plurality of first sections, each said first section including its own respective first power generator, first means for driving the first power generator and first non-return valve.

Preferably, the said conduit has one or more non-return valves to promote the flow of water from said one region to said other region.

The conduit may have an enlarged portion to promote the flow of water from said one region to said other region. Preferably, one non-return valve is located upstream from said enlarged portion. Preferably, a further non-return valve is located downstream from said enlarged portion.

In a modification of the previously described embodiment, the power generation means includes a second power generator;

said means for driving the power generation means includes a second means for driving the second power generator, and said passage further includes a second section in fluid communication with said other region;

said second section being in fluid communication with said conduit via a second non-return valve and including said second means for driving the second power generator;

such that when said other region has a higher water pressure than said one region, water flows from said other region into said second section and said conduit, wherein water flowing through said second section drives said second means for driving the second power generator and enters into said conduit via said second non-return valve for discharge into said one region.

This modified embodiment allows for greater power generation efficiency where there is a reversible flow of water through the system caused by differential water pressures in both regions of water over a tidal cycle.

The second section preferably has a portion to increase the speed of flow of water at said second means for driving the second power generator. The speed increasing portion of the second section may be substantially vertical.

The system preferably includes a plurality of second sections, each said second section including its own respective second power generator, second means for driving the second power generator and second non-return valve.

The conduit may have an enlarged portion to promote the flow of water between said regions of water. The conduit preferably has one or more two-way valves to promote the flow of water between said regions of water. A two-way valve may be provided at one end or both ends of the enlarged portion.

BRIEF DESCRIPTION OF THE DRAWINGS

Preferred embodiments will now be described, by way of example only, with reference to the accompanying drawings, of which.

BEST MODES OF CARRYING OUT THE INVENTION

Figure 1:
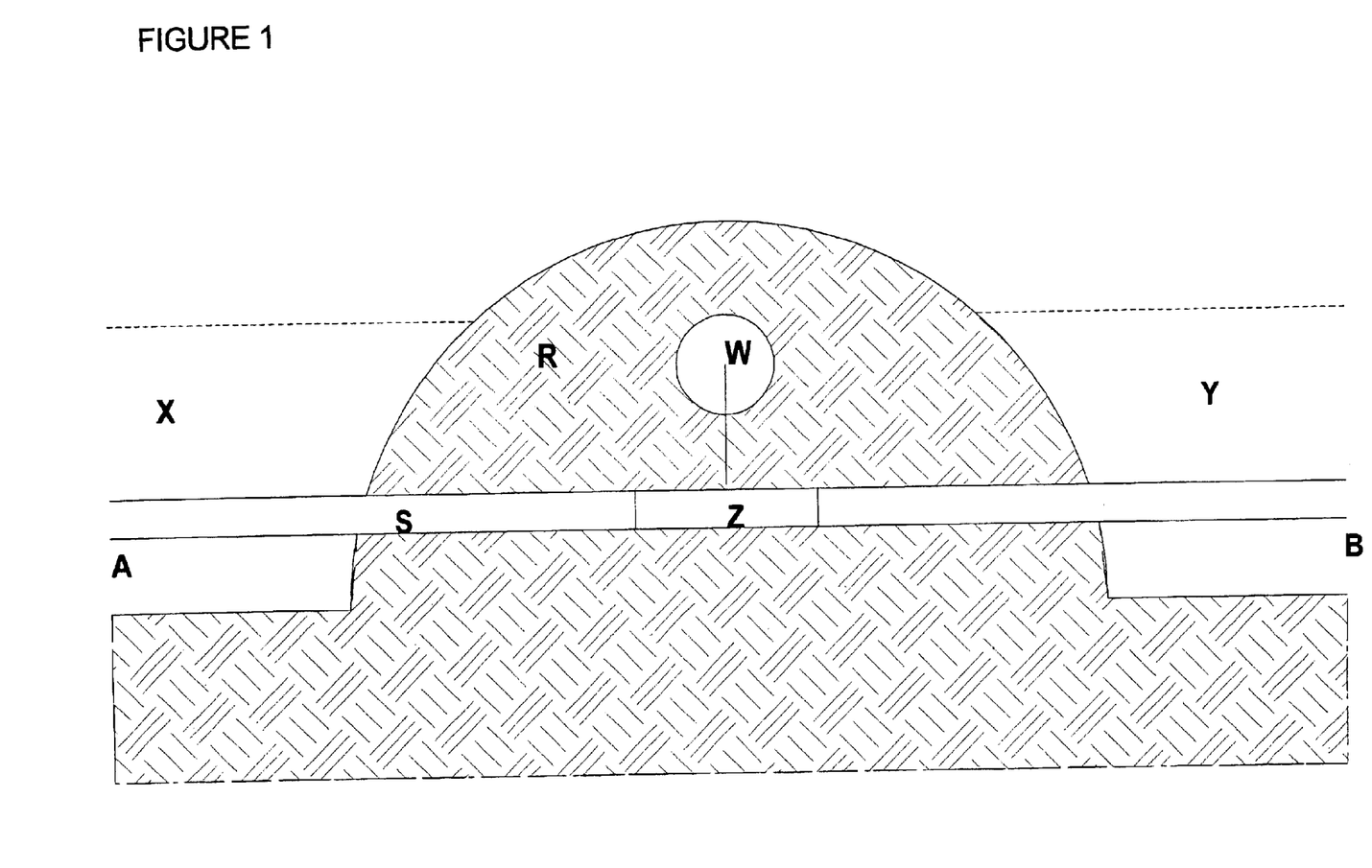
FIG. 1 is a schematic cross-sectional view of a system according to one embodiment of the invention.

FIG. 1 illustrates a system 1 for generating power from an unbounded body of water (i.e. in communication with a sea or ocean) according to a preferred embodiment of the invention. The system 1 includes a barrier R, a passage S, turbine Z, and power generator W.

The barrier R, such as a long wall or land mass, extends into a body of water so as to partially divide the unbounded body into two separate regions, X and Y. A passage S (for example, a pipe) is provided within the barrier R and allows fluid communication between regions X and Y via respective ports A, B. The rotating means Z is an electrical turbine and is located within the pipe S. Turbine Z is associated with power generator W, in this embodiment being an electrical generator. Turbine Z may comprise one or more turbines operating in the same or opposite rotational orientation, depending on the direction of fluid flow in S. The flow in pipe S may be unidirectional or bidirectional.

Regions X, Y will have varying tidal effects due to the division of the unbounded body of water by barrier R over the tidal cycle. Most of the time, these water pressures are not equal during the tidal cycle and it is believed that there will only be roughly equal water pressures between regions X and Y for only a short period or periods of time in a day. When the water pressure in region X near port A exceeds the water pressure in region Y near port B, water will flow from port A to port B via pipe S. The flow of water causes turbine Z to spin and drive generator W to produce electricity. Similarly, when the water pressure in region Y near port B exceeds the water pressure in region X near port A, water will flow in the reverse or opposite direction from port B to port A, via pipe S. Again, the flow of water causes turbine Z to spin (in the reverse direction), driving the generator W to produce electricity.

There need not be a water pressure difference over the whole of the regions X, Y as localised areas or zones in proximity to ports A, B need only have differing water pressures for the system to operate. Larger localised areas of differing water pressures at ports A, B will produce higher flows of water and consequently, greater power generation.

Figure 2:
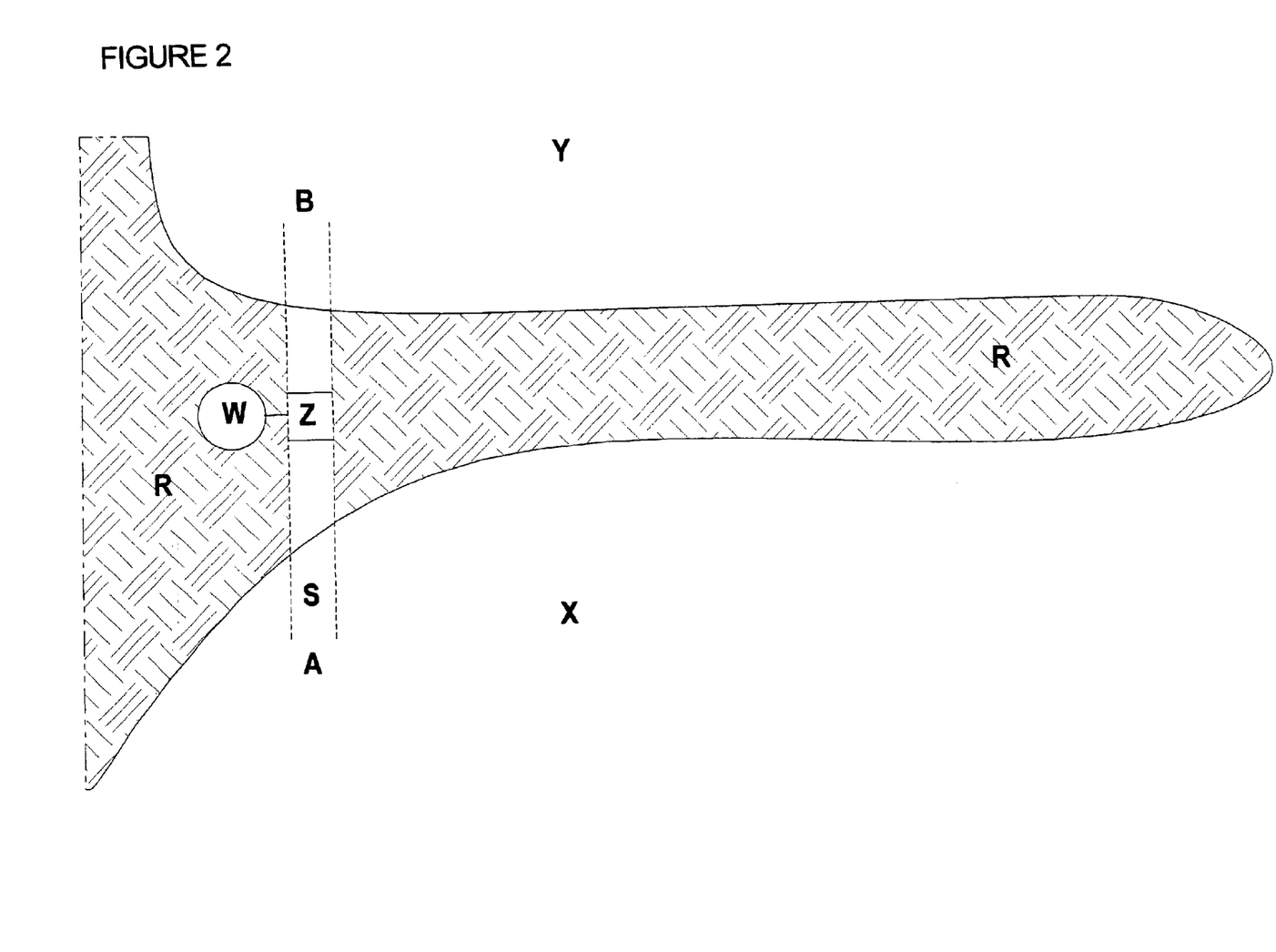
FIG. 2 is a plan view of the system of FIG. 1.

FIG. 2 is a plan view of system 1. Here, barrier R is a natural landmass. The land mass can be a peninsula, promontory, an isthmus or like geographical feature. The landmass must be of sufficient length, ideally in excess of 1 kilometer and possibly in the order of, say, 5 to 100 kilometers, to induce differing water levels in regions X and Y over a tidal cycle.

Figure 3:
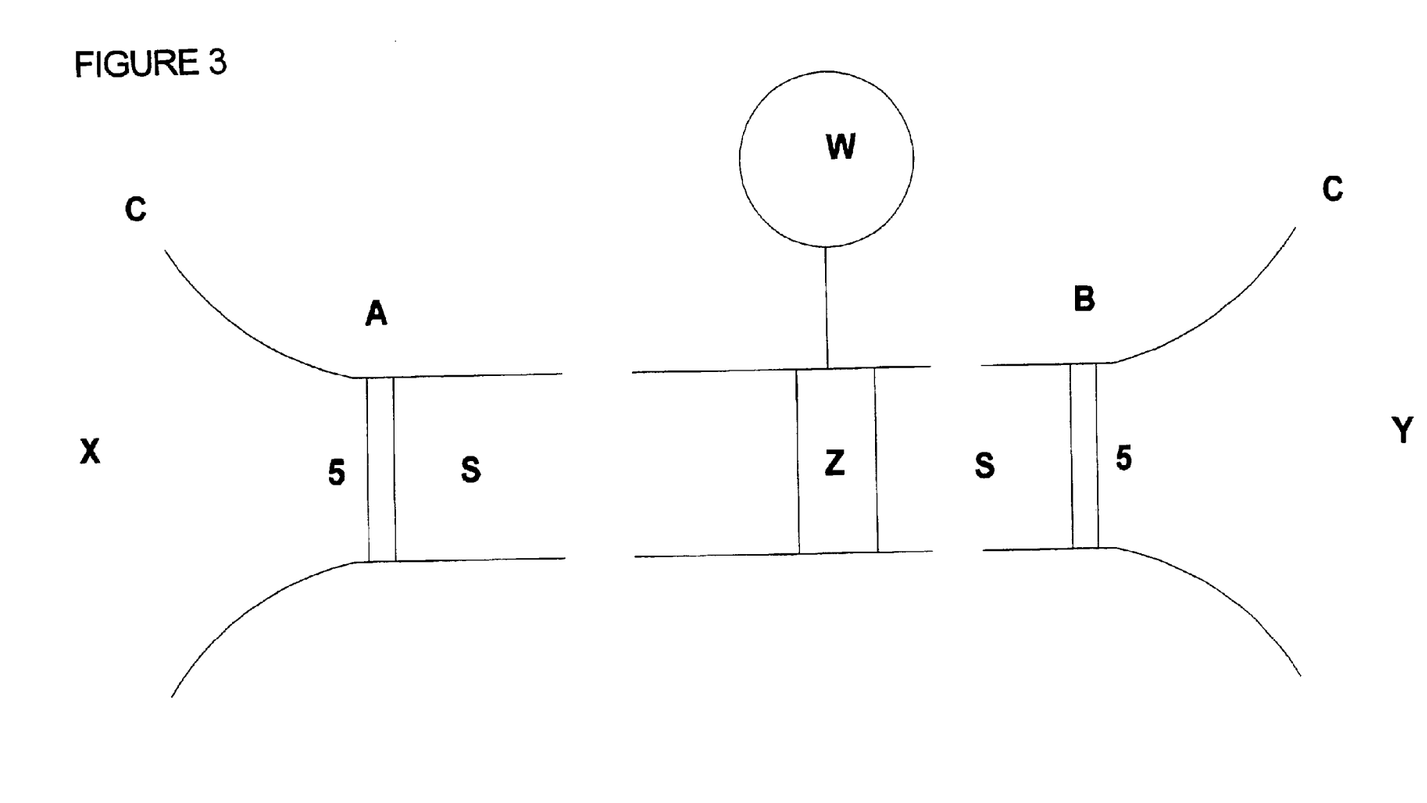
FIG. 3 is a schematic drawing of an embodiment of the passage used in the system.

FIG. 3 shows one embodiment of the pipe S shown in FIGS. 1 and 2. Pipe S has enlarged openings C at ports A and B. The enlarged openings C in this particular embodiment are curved funnel openings. The curved openings C encourage accelerated water flow into pipe S at port A or B, as the case may be. Alternatively, openings C can be flared and may be frusto-conical in shape. A grating 5 is provided at the mouth or interior to A and B to filter out objects which may otherwise hinder or damage the turbine. The grating 5 is preferably self-cleaning, for example with an automatic scraper periodically moving across the face of the grating in a manner similar to a windshield wiper.

Figure 4:
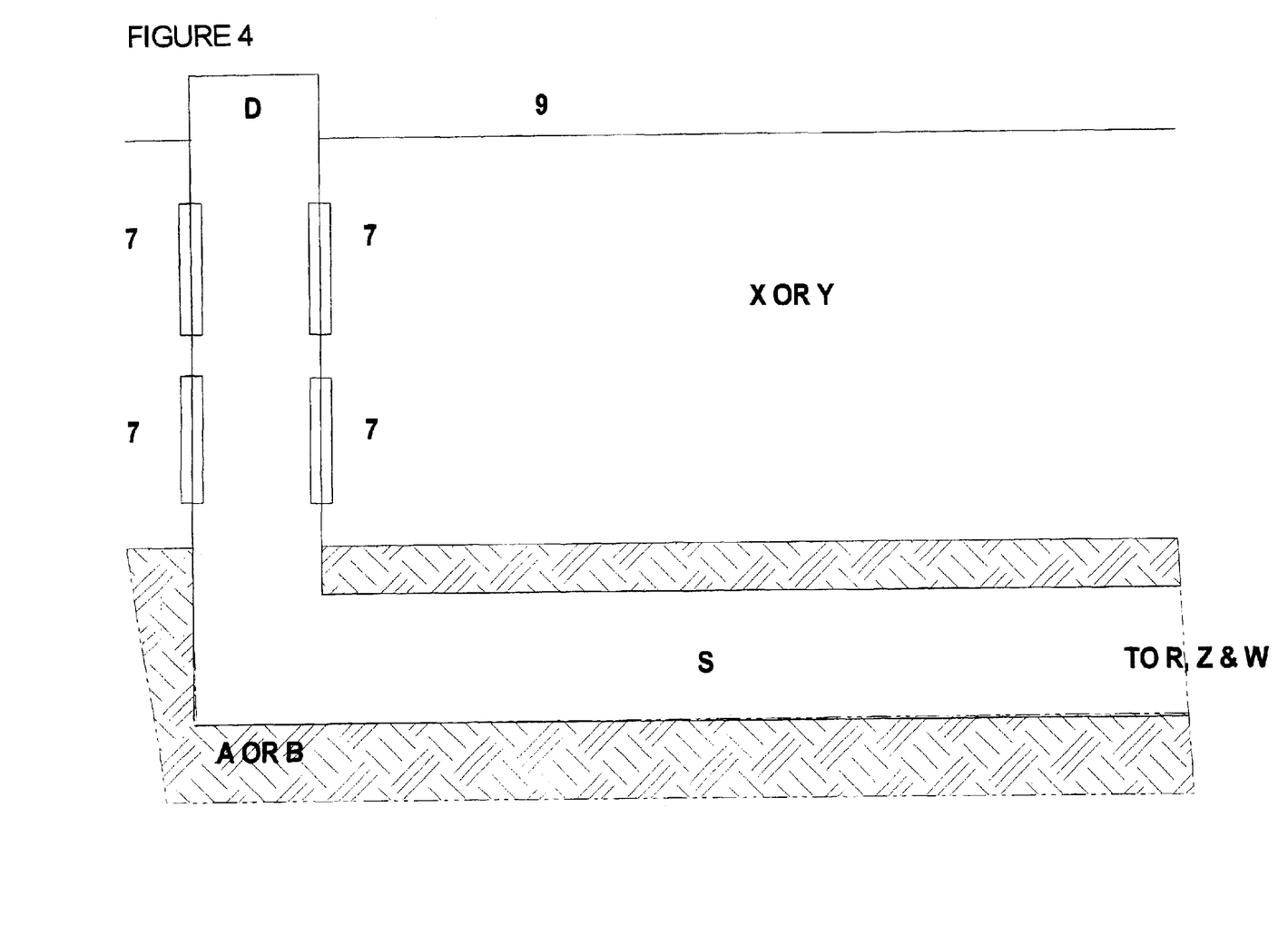
FIG. 4 is a schematic drawing of a further embodiment of the passage.

FIG. 4 shows a further embodiment of the pipe S. In this embodiment, pipe S has a circular collection tower D fluidly connected to either port A or B. Tower D extends substantially vertically so as to protrude above the highest water level of the regions of water X or Y. Closeable vents 7 are provided in the perimeter and at different heights of tower D to allow water to either enter or exit tower D.

The vents 7 are preferably automatically operable to close or open according to a timer on a tidal cycle or in response to a sensed water level 9 around the tower D. The top of D may be enclosed and extend above the mean high water mark of regions X or Y.

Figure 5:
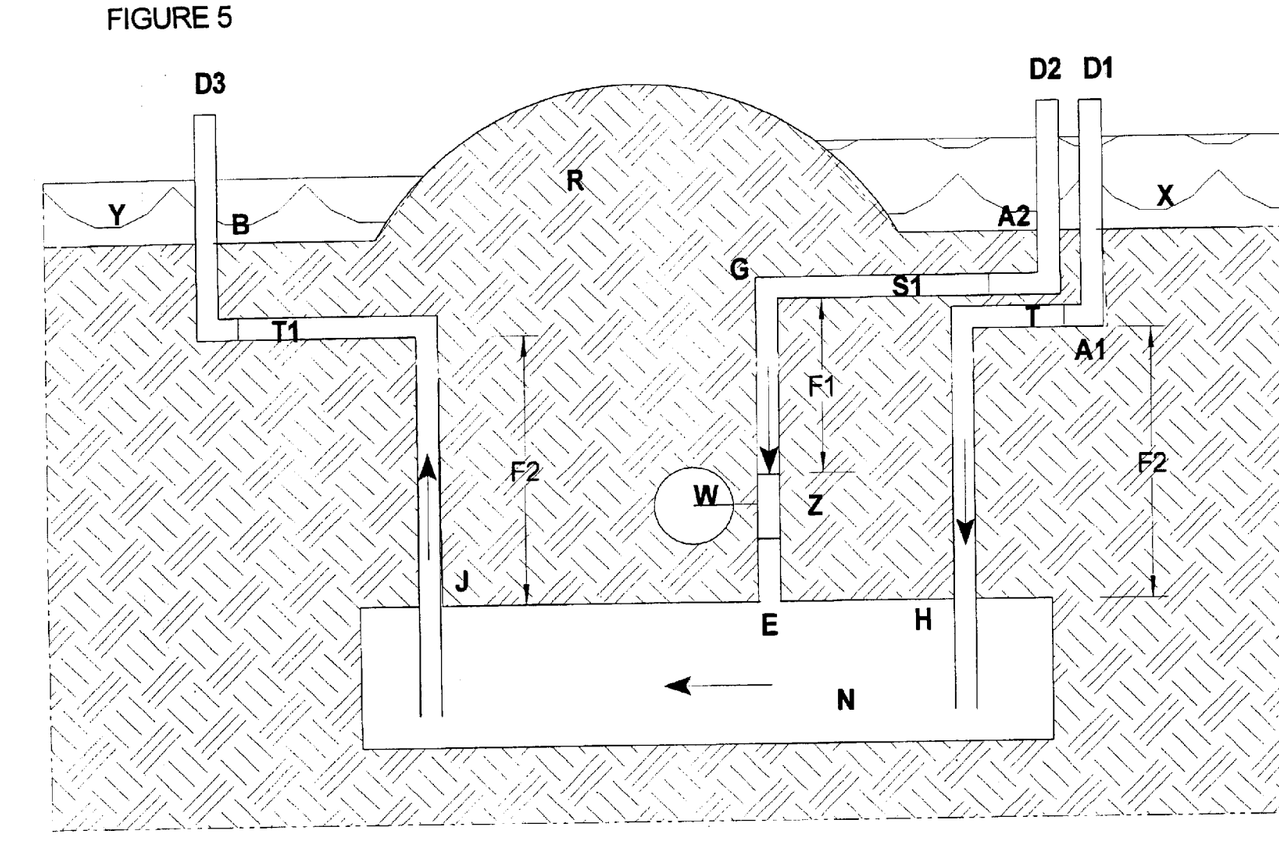
FIG. 5 is a schematic drawing of a system according to another embodiment of the invention.

FIG. 5 illustrates another preferred embodiment of the present invention. The system in this embodiment has two towers D1, D2 in one region of water, X, and a third tower D3 in the other region of water, Y. The towers D1, D2 and D3 are associated with pipes T, S1 and T1, respectively.

Pipe S1 has a substantially vertical portion of length F1 beginning at G and a turbine Z located towards the lower end of the vertical portion. Turbine Z is also operatively connected to electrical generator W. Pipe S1 also has a non-return valve E in the vertical portion downstream from the turbine Z.

Thus, water flowing through pipe S1 will fall for the distance F1 and the vertical distance between A2 and G (converting the potential energy of the water at G and A2 into kinetic energy) before striking turbine Z. It is preferred that the distance F1 is between 20 and 100 metres. While water falls vertically at A2 into pipe S1 to convert some of the potential energy of the water into kinetic energy, the substantial portion of the potential energy of the water is converted to kinetic energy at G.

Towers D1 and D3 have similar vertical portions, but do not have a turbine in their respective pipes T and T1.

Non-return valves H and J are also provided at the ends of pipes T, and T1, respectively. Towers D1 and D3 with their associated pipes T and T1 ensure that water flowing through tower D2 and pipe S1 is transported out of the system after passing turbine Z by providing a continuous, uninterrupted flow of water from zone A2 to zone B.

Valves E, H, and J are connected to an enlarged pipe N. Alternatively, N can be in the form of a tank. Valves E and H only permit water to flow from pipes S1 and T into enlarged pipe N, while valve J only permits water to flow from enlarged pipe N into pipe T1.

The provision of non-return valve E allows for the further and uninterrupted flow of water through pipe S1 and turbine Z by preventing the backflow of water into pipe S1. Similarly, non-return valve H prevents backflow of water in pipe T. Valve J operates in the same way, except that water is prevented from flowing back from pipe T1 into enlarged pipe N.

The embodiment of FIG. 5 uses gravity to increase the speed of flow of water at the point of contact of striking the turbine Z so as to increase the power generation efficiency of the system.

When the water pressure at zone A2 in region X is greater than at zone B of region Y, water flows into tower D2 and flows through pipe S1. The water then drops vertically at point G, accelerating as it falls distance F1 so as to strike turbine Z. Thus, the water expends most of the its kinetic energy by rotating turbine Z and so generates electricity via generator W. The water then falls through non-return valve E into enlarged pipe N. This process continues for as long as the water pressure differential exists between zone A2 and zone B.

At the same time as water flows through pipe tower D2 and pipe S1, and then into enlarged pipe N, water from zone A2 also enters tower D1. Water flows through pipe T and falls vertically a distance F2 through non-return valve H into enlarged pipe N. Once the water in the enlarged pipe N reaches a particular pressure, the water then flows continuously through non-return valve J upwards through pipe T1 and is discharged from tower D3 into region of water Y. The flow of water from enlarged pipe N includes the spent water that passed through pipe S1 and turbine Z from non-return valve E.

The valves E, H, and J with enlarged pipe N collectively act to regulate the flow of water through pipes S1, T, and T1. Towers D1, D3 and their respective pipes T, T1 ensure that water continuously flows from region X to region Y (and consequently continuous flow through turbine Z and pipe S1), thus allowing for continual power generation over the tidal cycle where the water pressure at zone A2 exceeds the water pressure at zone B.

In a modification of the system of FIG. 5, the tower D2 may have an expanded cross-section so as to allow pipe S1 to be divided into several smaller pipes, each smaller pipe having its own turbine Z and power generator W.

Figure 6:
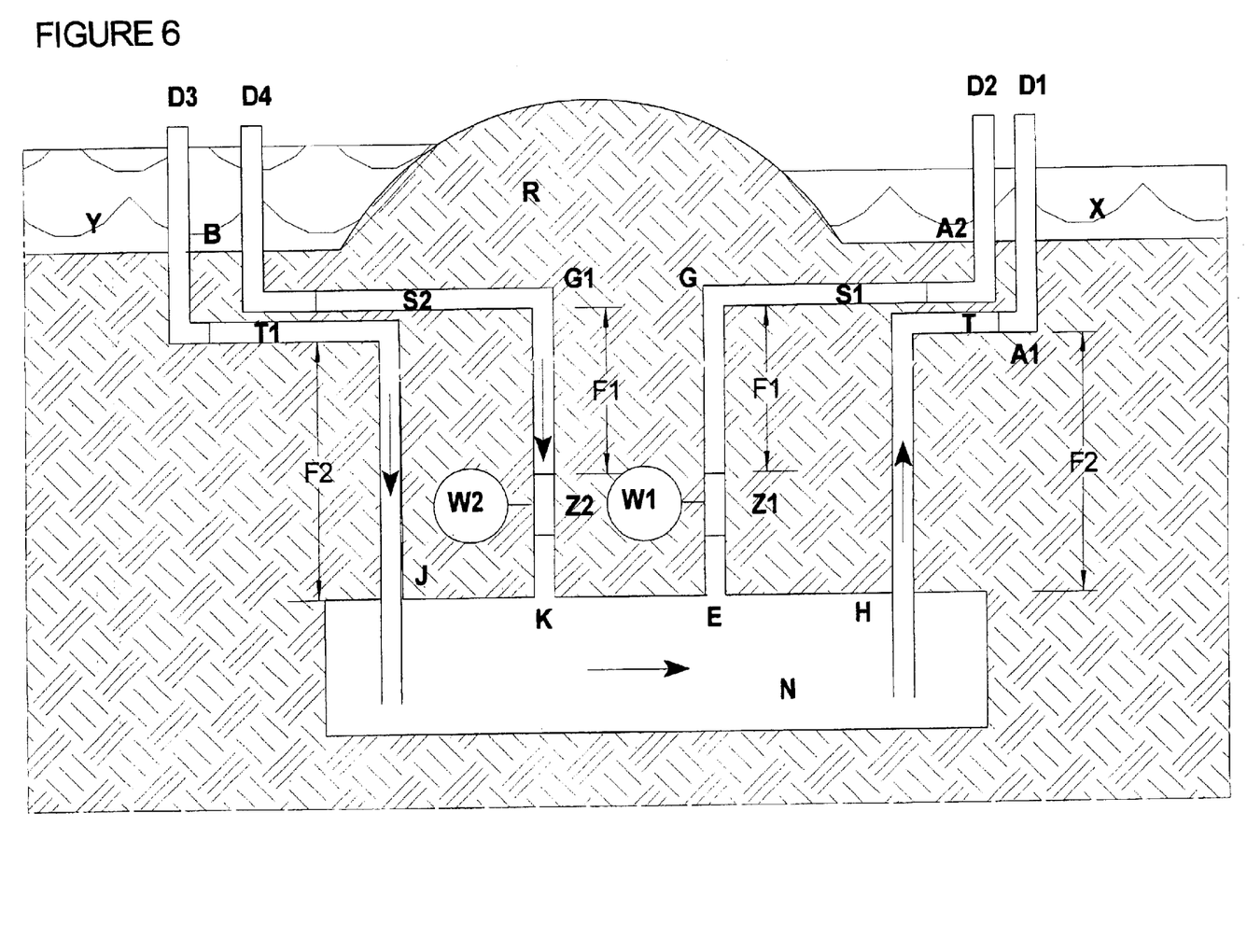
FIG. 6 is a schematic drawing of a system according to a further embodiment of the invention.

A further embodiment of the system is illustrated in FIG. 6.

In the embodiment of FIG. 6, the system of FIG. 5 has been further modified to provide power generation from water movement in two directions; from zone A2 of region X to zone B of region Y (as described in relation to FIG. 5) and from zone B of region Y to zone A2 of region X. That is, the system of FIG. 6 provides for a reversible flow of water and therefore of near constant power generation over both inward and outward tidal cycles.

In the system of FIG. 6, a further tower D4 is provided in region Y with pipe S2 having turbine Z2 and generator W2.

Pipe S2 has a vertical portion at G1 with turbine Z2 at the same distance F1 from G1 as in pipe S1. Pipe S2 also has a non-return valve K which functions the same way as non-return valve E in pipe S1.

While non-return valve E operates in the same fashion as described in relation to FIG. 5, valves H and J of pipes T and T1 now allow water to flow in two directions. This permits reversibility of water flow in the system. The valves H and J can be made selectively non-return so as to be non-return in one direction and then non-return in the opposite direction, depending on which way water is flowing in the system to generate power.

The system of FIG. 6 works in the same way as described above in relation to FIG. 5. However, when the water pressure at B is greater than at A2, water enters tower D4 and flows through pipe S2. The water falls at point G1 and increases its speed of flow for a distance F1 where it contacts the turbine Z2. Turbine Z2 rotates, generating power at W2. The majority of the kinetic energy of the falling water now being expended, the outflow from Z2 falls through the non-return valve K to fall into the enlarged pipe N. This process is continual for the period of time where the water pressure at B exceeds that at A2.

Again, concurrent with the above process in tower D4 and pipe S2, water also enters the tower D3 and flows through pipe T1 to fall directly through the valve J into enlarged pipe N. When the water pressure in enlarged pipe N exceeds a certain threshold, water will flow from enlarged pipe N through valve H and pipe T, discharging into region of water X. This flow of water from T1 through T has also collected the spent water from K. Thus, as described above in relation to FIG. 5, towers D1, D3 and their respective pipes T, T1 provide for the further and un-interrupted flow of water from region Y to region X (and consequently continuous flow through turbine Z2 and pipe S2), allowing for the continual generation of power over the tidal cycle where the water pressure at zone B exceeds the water pressure at zone A2.

As described in relation to FIG. 5, D4 can also be a large collection tower so that the pipe S2 may be divided into several smaller pipes, each with its own turbine Z and generator W.

In all embodiments the pipes S, S1 and S2 may narrow as the pipe approaches the turbine Z, Z1 and Z2 so as to accelerate the flow of water prior to contact with the turbine Z.

In the embodiments shown in FIGS. 5 and 6, towers D2/D1 and D3/D4 may be arranged coaxially. That is, D2 and D1, or D3 and D4, can be fitted one inside the other. Alternatively, towers D1 and D2 may be formed as a single tower but with bifurcated passages, S1 and T, where S1 leads to turbine Z1 and generator WI while passage T leads to enlarged pipe N. D2 and D1 together and D3 and D4 together may also be single towers, each with a bifurication of the flow in either combination to provide water to both turbine(s) Z1, Z2, and enlarged pipe N.

As can be seen by the above description, power can be produced by the utilization of differential water pressures existing across a barrier partially dividing an unbounded body of water into two regions having different water levels over a particular cycle, such as a lunar tidal cycle.

A particular advantage of the present system is that it allows power to be generated by the movement of water between the regions of differing water pressure induced by the barrier; that is, the barrier effectively induces the regions of water to have different tidal level properties. Moreover, the system can generate power throughout a daily cycle as the system provides for the flow of water to be fully reversible between the two regions of water, X, Y.

The systems of the preferred embodiments use a simple construction and can be conveniently constructed. The preferred embodiments do not require the construction of any walls to bound any regions of water or necessitate the provision of gates or locks in which to increase the water pressure in one region in order to induce the movement of water between the two regions.

What is claimed is:

1. A system for generating power, said system including a water passage linking two naturally occurring regions of tidal water on opposite sides of a naturally formed barrier such that the water level in a first region can differ from the water level in the second region as a result of naturally restricted tidal flow of water between the first and second regions, the passage extending between the first and second regions of water and across the naturally formed barrier whereby water will flow through the passage from the region of higher water level to the region of lower water level, and a turbine driven by the water flowing through the passage.

2. A system according to claim 1, wherein the passage extends substantially horizontally through the naturally formed barrier.

3. A system according to claim 1, wherein water is able to flow through the passage in both directions from whichever region has a higher water level at any given time and the turbine is driven by water flow in each direction whereby the system is able to generate power over a part of the tidal cycle whenever a difference in level exists between the first and second water regions.

4. A system according to claim 3, wherein the passage extends substantially horizontally through the naturally formed barrier.

5. A system according to claim 4, wherein the barrier is a land mass formed by a peninsula, promontory, or isthmus.

6. A system for generating power, said system including a water passage linking first and second naturally occurring regions of tidal water to a relative difference in water levels arising from tidal flow of water from one of said first and second regions to the other of said first and second regions, and a turbine driven by water flowing through the passage from the region having the higher water level to the region having the lower water level, the level difference between the first and second regions being naturally induced as a result of the natural topography of the land mass by which the first and second regions are defined whereby power generation is achieved without artificially damming the natural flow between the two regions.

7. A system according to claim 6, wherein water is able to flow through the passage in both directions from whichever region has a higher water level at any given time and the turbine is driven by water flow in each direction whereby the system is able to generate power over a part of the tidal cycle whenever a difference in level exists between the two water regions.

* * * * *